US012159478B2

United States Patent
Dong et al.

(10) Patent No.: US 12,159,478 B2
(45) Date of Patent: Dec. 3, 2024

(54) POLAR RELATIVE DISTANCE TRANSFORMER

(71) Applicant: PayPal, Inc., San Jose, CA (US)

(72) Inventors: Yanfei Dong, Singapore (SG); Yuan Deng, Singapore (SG); Hewen Wang, Singapore (SG); Xiaodong Yu, Singapore (SG)

(73) Assignee: PayPal, Inc., San Jose, CA (US)

( * ) Notice: Subject to any disclaimer, the term of this patent is extended or adjusted under 35 U.S.C. 154(b) by 536 days.

(21) Appl. No.: 17/547,680

(22) Filed: Dec. 10, 2021

(65) Prior Publication Data

US 2023/0186668 A1 Jun. 15, 2023

(51) Int. Cl.
*G06V 30/414* (2022.01)
*G06F 40/106* (2020.01)
*G06F 40/114* (2020.01)
*G06V 30/148* (2022.01)

(52) U.S. Cl.
CPC .......... *G06V 30/414* (2022.01); *G06F 40/106* (2020.01); *G06F 40/114* (2020.01); *G06V 30/153* (2022.01)

(58) Field of Classification Search
CPC .. G06V 30/414; G06V 30/153; G06F 40/114; G06F 40/106
See application file for complete search history.

(56) References Cited

PUBLICATIONS

Wikipedia | "Coordinate system". Website https://en.wikipedia.org/wiki/Coordinate_system, last accessed Nov. 23, 2021, 7 pages.
Vaswani, A. et al. | "Attention Is All You Need". 31st Conference on Neural Information Processing Systems (NIPS 2017), Long Beach, CA, USA, arXiv:1706.03762v5 [cs.CL] Dec. 6, 2017, 15 pages.
Dosovitskiy, A. et al. | "An Image is Worth 16X16 Words: Transformers for Image Recognition at Scale". arXiv:2010.11929v2 [cs.CV] Jun. 3, 2021, 22 pages.
Carion, N. et al. | "End-to-End Object Detection with Transformers". arXiv:2005.12872v3 [cs.CV] May 28, 2020, 26 pages.

(Continued)

*Primary Examiner* — Mark Roz
(74) *Attorney, Agent, or Firm* — Greenberg Traurig, LLP

(57) ABSTRACT

A system can comprise a processor that can facilitate performance of operations, comprising accessing a document comprising a plurality of text bounding boxes, wherein each respective text bounding box of the plurality of text bounding boxes comprises respective text, for each respective text bounding box, determining respective text bounding box coordinates and respective text bounding box input embeddings, based on the respective text bounding box coordinates, determining respective text bounding box positional encodings for each respective text bounding box, based on a transformer-based deep learning model applied to the respective text bounding box input embeddings, respective text bounding box coordinates, respective text bounding box positional encodings, and bias information representative of a modification to an attention weight of the transformer-based deep learning model, determining respective output embeddings for each respective text bounding box, and based on the respective output embeddings, generating respective bounding box labels for each respective bounding box.

20 Claims, 8 Drawing Sheets

(56) References Cited

PUBLICATIONS

Shaw, P. et al. | "Self-Attention with Relative Position Representations". arXiv:1803.02155v2 [cs.CL] Apr. 12, 2018, 5 pages.
Dai, Z. et al. | "Transformer-XL: Attentive Language Models Beyond a Fixed-Length Context". arXiv:1901.02860v3 [cs.LG] Jun. 2, 2019, 20 pages.
Huang, Z. et al. | "Improve Transformer Models with Better Relative Position Embeddings". arXiv:2009.13658v1 [cs.CL] Sep. 28, 2020, 9 pages.
Chu, X. et al. | "Conditional Positional Encodings for Vision Transformers". arXiv:2102.10882v2 [cs.CV] Mar. 18, 2021, 13 pages.

FIG. 3

```
                                    ┌─ 600
602 ─ GENERATING, BY A COMPUTER SYSTEM COMPRISING A PROCESSOR,
      INPUT EMBEDDINGS REPRESENTATIVE OF TEXT BOUNDING BOX
      COORDINATES OF A DOCUMENT COMPRISING A PLURALITY OF TEXT
      BOUNDING BOXES AND RESPECTIVE TEXT IDENTIFIED USING
      ELECTRONIC OPTICAL CHARACTER RECOGNITION

604 ─ BASED ON THE INPUT EMBEDDINGS, DETERMINING, BY THE COMPUTER
      SYSTEM, TEXT BOUNDING BOX POSITIONAL ENCODINGS FOR EACH
      RESPECTIVE TEXT BOUNDING BOX

606 ─ DETERMINING, BY THE COMPUTER SYSTEM, BIAS INFORMATION
      REPRESENTATIVE OF A MODIFICATION TO AN ATTENTION WEIGHT OF A
      TRANSFORMER-BASED MACHINE LEARNING MODEL

608 ─ DETERMINING, BY THE COMPUTER SYSTEM, OUTPUT EMBEDDINGS FOR
      EACH TEXT BOUNDING BOX USING THE TRANSFORMER-BASED MACHINE
      LEARNING MODEL APPLIED TO THE INPUT EMBEDDINGS, TEXT
      BOUNDING BOX COORDINATES, TEXT BOUNDING BOX POSITIONAL
      ENCODINGS, AND THE BIAS INFORMATION

610 ─ GENERATING, BY THE COMPUTER SYSTEM AND USING MACHINE
      LEARNING APPLIED TO THE OUTPUT EMBEDDINGS, A PLURALITY OF
      BOUNDING BOX LABEL PROBABILITIES FOR EACH TEXT BOUNDING BOX

612 ─ GENERATING, BY THE COMPUTER SYSTEM AND BASED ON THE
      PLURALITY OF BOUNDING BOX LABEL PROBABILITIES FOR EACH TEXT
      BOUNDING BOX, A RESPECTIVE BOUNDING BOX LABEL FOR EACH TEXT
      BOUNDING BOX, WHEREIN EACH BOUNDING BOX LABEL COMPRISES A
      RESPECTIVE TYPE OF FIELD IN THE DOCUMENT
```

FIG. 6

POLAR RELATIVE DISTANCE TRANSFORMER

TECHNICAL FIELD

The disclosed subject matter generally relates to machine learning, and more particularly to transformer models that utilize polar relative distances for entity extraction from various documents.

BACKGROUND

Existing identity verification solutions typically utilize manual processes in order to verify that a submitted proof of identity (POI) document corresponds to the submitter, or to a user profile associated with the submitter. POI documents are often submitted from different countries or regions, thus comprising a variety templates and backgrounds. Therefore, conventional rule-based information extraction methods are unreliable. Conventional OCR (Optical Character Recognition) models can convert images into text, but the outputs are in the form of bounding boxes and associated text. From conventional OCR, it is not immediately clear which type of entity a span of text comprises. Thus, such solutions merely convert an image of a document to text without regard for different fields on the document. Without determining fields in a document, text in the document can be mistaken for the wrong type, such as expiration date being confused for a birth date in an image of a driver's license. Therefore, existing identity verification solutions can exhibit low accuracies and cause delays in identity verification.

BRIEF DESCRIPTION OF DRAWINGS

FIG. 3 illustrates a diagram of exemplary combinatorial optimization in accordance with one or more embodiments described herein.

FIG. 6 is a block flow diagram for a process associated with entity extraction in accordance with one or more embodiments described herein.

DETAILED DESCRIPTION

Figure 1:
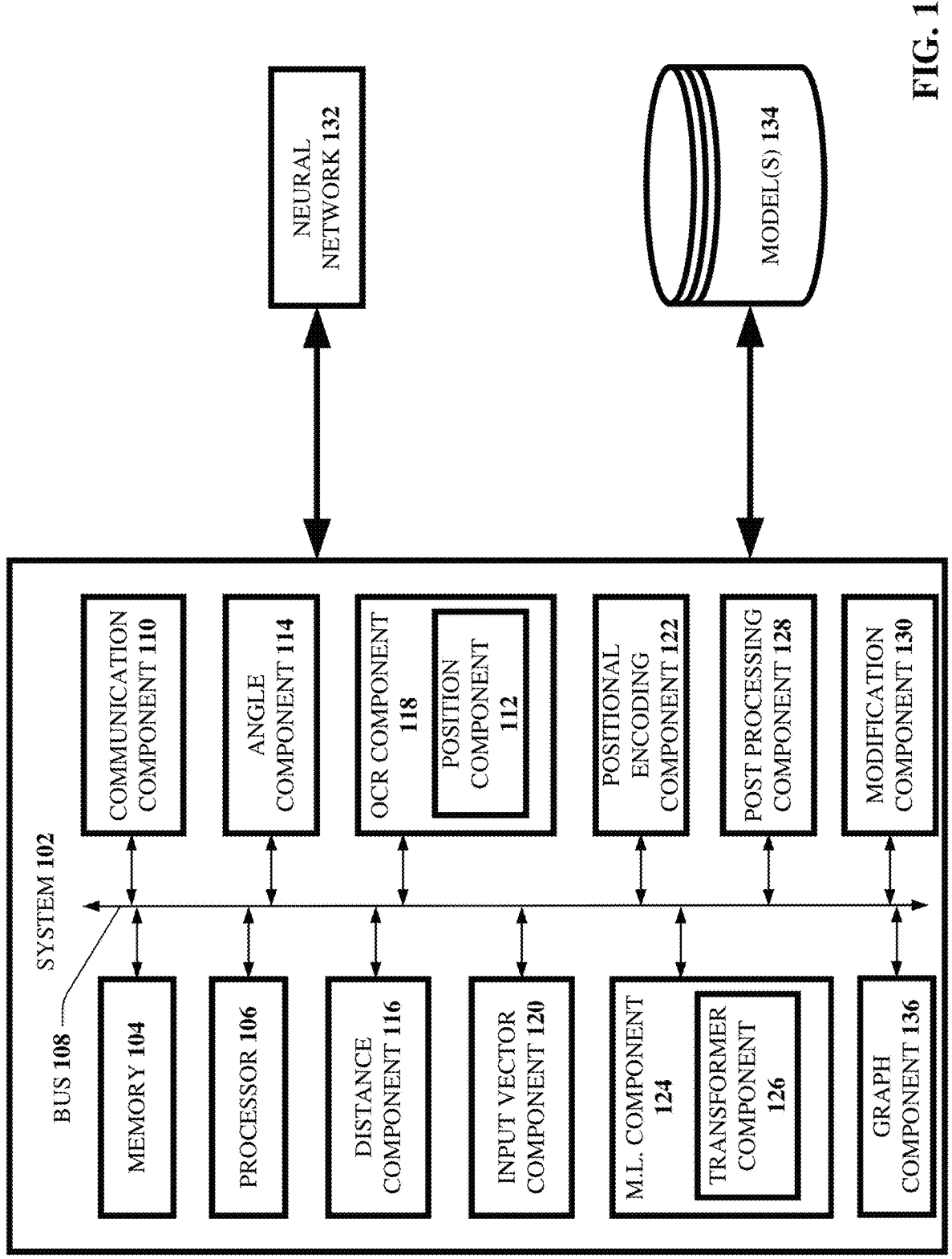
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, identity verification can be improved in various ways, and various embodiments are described herein to this end and/or other ends.

According to an embodiment, a system can comprise a processor and a non-transitory computer-readable medium having stored thereon computer-executable instructions that are executable by the system to cause the system to perform operations comprising: accessing a document comprising a plurality of text bounding boxes, wherein each respective text bounding box of the plurality of text bounding boxes comprises respective text, for each respective text bounding box, determining respective text bounding box coordinates (e.g., x,y absolute coordinates of corners) and respective text bounding box input embeddings, based on the respective text bounding box coordinates, determining respective text bounding box positional encodings for each respective text bounding box, based on a transformer-based deep learning model applied to the respective text bounding box input embeddings, respective text bounding box coordinates, respective text bounding box positional encodings, and bias information representative of a modification to an attention weight of the transformer-based deep learning model, determining respective output embeddings for each respective text bounding box, and based on the respective output embeddings, generating respective bounding box labels for each respective bounding box. In various embodiments, the bounding box labels can be representative of a type (e.g., entity) of the field, such as an expiration date (e.g., expiry date), identification number, first name, last name, middle name, address, sex or gender, height, eye color, date of birth, education or school, business name or type, employee information, bank account information, credit information, billing information, or other suitable POI information.

In one or more embodiments, determining respective bounding box labels for each respective bounding box can comprise determining, using a neural network, one or more bounding box label probabilities for each respective text bounding box. For example, a neural network herein can comprise a feed forward neural network that can learn weights and/or determine how much weight to place on certain relative distances, angles, or other suitable information herein. In this regard, the above operations can further comprise: based on the one or more bounding box label probabilities for each respective text bounding box, generating the respective bounding box labels. In some implementations, the respective bounding box labels can be generated using a combinatorial optimization algorithm (e.g., Hungarian matching or other suitable combinatorial optimization algorithms) applied to the one or more bounding box label probabilities for each respective text bounding box. For example, such a combinatorial optimization algorithm can remove duplicates and/or improve accuracy of the respective bounding box labels herein. In further implementations, the neural network can be trained using one or more template documents.

In some embodiments, said bias information can comprise a conditional attention bias based on a graph structure representative of relative positions of the plurality of text bounding boxes. In this regard, such a graph structure can comprise a visual representation of the text bounding boxes in space, relative to one another (e.g., and/or based on absolute positions/coordinates). In further embodiments, said bias information can comprise a conditional attention bias based on polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems) of the plurality of text bounding boxes. In this regard, angle information between two or more text bounding boxes and respective relative distances can be utilized in multi-headed attention layer processing. For instance, the above operations can further comprise: determining polar relative distances between the plurality of text bounding boxes. In this regard, determining respective output embeddings for each respective text bounding box can be further based on the transformer-based deep learning model applied to the polar relative distances. The polar relative distances can be based on relative distances and/or angles with respect to text bounding box coordinates. It is noted that the transformer-based deep learning model can be generated based on using machine learning applied to past documents comprising a past plurality of text bounding boxes, other than the document. In some embodiments, the past documents can comprise template documents. In further embodiments, the past documents can comprise documents previously accessed or received by systems and/or associated components herein. In various implementations, respective text can be identified using electronic optical character recognition (OCR). The OCR can be utilized to generate the text bounding boxes and recognize the corresponding text. In one or more embodiments herein, said document can comprise a proof of identity (POI) document.

In another embodiment, a computer-implemented method can comprise: generating, by a computer system comprising a processor, input embeddings representative of text bounding box coordinates of a document comprising a plurality of text bounding boxes and respective text identified using electronic optical character recognition, based on the input embeddings, determining, by the computer system, text bounding box positional encodings for each respective text bounding box, determining, by the computer system, bias information representative of a modification to an attention weight of a transformer-based machine learning model, determining, by the computer system, output embeddings for each text bounding box using the transformer-based machine learning model applied to the input embeddings, text bounding box coordinates, text bounding box positional encodings, and the bias information, generating, by the computer system and using machine learning applied to the output embeddings, a plurality of bounding box label probabilities for each text bounding box, and generating, by the computer system and based on the plurality of bounding box label probabilities for each text bounding box, a respective bounding box label for each text bounding box, wherein each bounding box label comprises a respective type of field in the document. It is noted that the plurality of bounding box label probabilities for each text bounding box can be representative of a probability of each possible bounding box label for each text bounding box. It is additionally noted that in one or more embodiments, the respective bounding box label for each text bounding box can be generated using a combinatorial optimization algorithm (e.g., Hungarian matching) applied to the plurality of bounding box label probabilities for each text bounding box of the plurality of text bounding boxes.

In some embodiments, said bias information can comprise a conditional attention bias based on a graph structure representative of relative positions of the plurality of text bounding boxes. In this regard, the relative positions of the plurality of text bounding boxes can comprise neighbor information representative of a degree to which each text bounding box of the plurality of text bounding boxes is a neighbor to another text bounding box of the plurality of text bounding boxes. For example, immediate neighbors can comprise first degree neighbors, second degree neighbors can comprise a text bounding box in-between the second degree neighbors, and so on. In further embodiments, said bias information can comprise a conditional attention bias based on polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems) of the plurality of text bounding boxes. In this regard, the conditional attention bias can be based on a graph structure representative of relative positions of the plurality of text bounding boxes. Further in this regard, the relative positions of the plurality of text bounding boxes can comprise neighbor information representative of a degree to which each text bounding box of the plurality of text bounding boxes is a neighbor to another text bounding box of the plurality of text bounding boxes. It is noted that the transformer-based machine learning model can be generated based on machine learning applied to past documents comprising a past plurality of text bounding boxes, other than the document and/or to one or more template documents associated with the document.

In yet another embodiment, a system can comprise: a processor that executes computer executable components stored in memory, an optical character recognition component that determines bounding boxes and respective text of a proof of identity document using electronic optical character recognition applied to the proof of identity document, an input vector component that generates input embeddings for each bounding box and respective text of the proof of identity document, a position component that determines absolute coordinates of the bounding boxes, a positional encoding component that determines positional encodings for each bounding box, a graph component that determines a degree to which bounding box pairs of the bounding boxes are neighbors, a distance component that determines polar relative distances for the bounding box pairs, a transformer component that determines output embeddings for each bounding box based on a transformer-based deep learning model applied to the input embeddings, bounding box coordinates, positional encodings, and bias information representative of a modification to an attention weight of the transformer-based deep learning model, a neural network component that generates a plurality of bounding box label probabilities for each bounding box, and a post-processing component that, based on the plurality of bounding box label probabilities and using a combinatorial optimization algorithm, determines a respective bounding box label for each bounding box, and associates each respective bounding box label with each respective text. It is noted that, in various embodiments, the bias information can comprise a conditional attention bias based on a graph structure representative of relative positions of the bounding boxes and a conditional attention bias based on polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems) of the bounding boxes.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

It should be appreciated that additional manifestations, configurations, implementations, protocols, etc. can be utilized in connection with the following components described herein or different/additional components as would be appreciated by one skilled in the art.

Turning now to FIG. 1, there is illustrated an example, non-limiting system 102 in accordance with one or more embodiments herein. System 102 can comprise a computerized tool (e.g., any suitable combination of computer-executable hardware and/or computer-executable software) which can be configured to perform various operations relating to entity extraction herein. The system 102 can comprise one or more of a variety of components, such as memory 104, processor 106, bus 108, communication component 110, position component 112, angle component 114, distance component 116, optical character recognition (OCR) component 118, input vector component 120, positional encoding component 122, machine learning (ML) component 124, transformer component 126, post processing component 128, modification component 130, model 134, and/or graph component 136. In various embodiments, the system 102 can be communicatively coupled to and/or comprise a neural network 132.

In various embodiments, one or more of the memory 104, processor 106, bus 108, communication component 110, position component 112, angle component 114, distance component 116, OCR component 118, input vector component 120, positional encoding component 122, machine learning (ML) component 124, transformer component 126, post processing component 128, modification component 130, neural network 132, model 134, and/or graph component 136 can be communicatively or operably coupled (e.g., over a bus or wireless network) to one another to perform one or more functions of the system 102.

According to an embodiment, the communication component 110 can access a document comprising a plurality of text bounding boxes. In further embodiments, the document can be received by the communication component 110. Such documents (e.g., POI documents, communication documents or transcripts, emails, scans, photographs, video captures or extracts, screenshots or screen captures, or other suitable documents) can be received in response to an identity verification request or conformation. Such requests can be associated with bank applications, credit applications, account creations, suspected fraudulent activity, account updates, or associated with other suitable requests. In various embodiments, each respective text bounding box of the plurality of text bounding boxes can comprise respective text. It is noted that said text can be identified using OCR (e.g., via the OCR component 118 as later discussed in greater detail). In further embodiments machine vision, artificial intelligence, image recognition, machine learning, or other suitable image scanning components or technologies can be utilized to extract text and/or associated text bounding boxes from documents, images, or other suitable captures herein.

It is noted that the communication component 110 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

According to an embodiment, the position component 112 (e.g., of the OCR component 118) can, for each respective text bounding box, determine respective text bounding box coordinates (e.g., absolute coordinates). In this regard, the OCR component 118 can identity respective text bounding box coordinates and/or respective text. For example, it can be determined by the system 102 and/or a respective component (e.g., ML component 124 and/or transformer component 126) that first name and last name are typically positionally close to each other or typically comprise a particular alignment. Thus, according to an example, if the position component 112 identifies two bounding boxes that are close to each other, and both contain text, then there can exist a probability that the two bounding boxes comprise first name and last name (e.g., as later determined or predicted by a suitable component herein).

According to an embodiment, the input vector component 120 can, for each respective text bounding box, determine respective text bounding box input embeddings (e.g., based on the respective text determined or generated by the OCR component 118). In this regard, the input vector component 120 can generate the input embeddings for each bounding box and respective text of the POI document. It is noted that said input embeddings can comprise input vectors for each text bounding box. In various embodiments, the input vector component 120 can, for instance, determine the respective text bounding box input embeddings by converting text into tokens by utilizing a suitable fixed representation. According to an embodiment, the positional encoding component 122 can, based on the respective text bounding box coordinates, determine respective text bounding box positional encodings for each respective text bounding box. In various embodiments, the positional encoding component 122 can add a respective positional encoding vector to respective token embeddings. In various embodiments, positional encoding herein can be utilized in input embeddings, for instance, because in some embodiments, the order of inputs is not considered by the transformer component 126.

According to an embodiment, the M.L. component 124 can comprise a transformer component 126. In this regard, the transformer component 126 can, based on a transformer-based deep learning model (e.g., model 134) applied to the respective text bounding box input embeddings, respective text bounding box coordinates, respective text bounding box positional encodings, and/or bias information representative of a modification to an attention weight of the transformer-based deep learning model, determine respective output embeddings for each respective text bounding box. It is noted that in some embodiments, the bias information can comprise a conditional attention bias based on a graph structure (e.g., generated via the graph component 136) representative of relative positions of the plurality of text bounding boxes. It is noted that the graph component 136 can determine a degree to which text bounding box pairs of the text bounding boxes are neighbors (e.g., relative positions). Further, the distance component 116 can determine polar relative distances for bounding box pairs. In this regard, the conditional attention bias can be based on a graph structure representative of relative positions of the plurality of text bounding boxes. Further in this regard, the relative positions of the plurality of text bounding boxes can comprise neighbor information representative of a degree to which each text bounding box of the plurality of text bounding boxes is a neighbor to another text bounding box of the plurality of text bounding boxes. In further embodiments, the bias information can comprise a conditional attention bias based on polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems) of the plurality of text bounding boxes. It is additionally noted that the model 134 can be generated based on machine learning applied to past documents comprising a past plurality of text bounding boxes, other than the document and/or to one or more template documents associated with the document.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or ML components (e.g., ML component 124) herein can comprise artificial intelligence component(s) which can employ an artificial intelligence (AI) model and/or ML or an ML model that can learn to perform the above or below described functions (e.g., via training using historical training data and/or feedback data).

In some embodiments, ML component 124 can comprise an AI and/or ML model that can be trained (e.g., via supervised and/or unsupervised techniques) to perform the above or below-described functions using historical training data comprising various context conditions that correspond to various management operations. In this example, such an AI and/or ML model can further learn (e.g., via supervised and/or unsupervised techniques) to perform the above or below-described functions using training data comprising feedback data, where such feedback data can be collected and/or stored (e.g., in memory) by an ML component 124. In this example, such feedback data can comprise the various instructions described above/below that can be input, for instance, to a system herein, over time in response to observed/stored context-based information.

AI/ML components herein can initiate an operation(s) associated with a based on a defined level of confidence determined using information (e.g., feedback data). For example, based on learning to perform such functions described above using feedback data, performance information, and/or past performance information herein, an ML component 124 herein can initiate an operation associated with polar relative distance transformers or other suitable transformers. In another example, based on learning to perform such functions described above using feedback data, an ML component 124 herein can initiate an operation associated with updating a model herein.

In an embodiment, the ML component 124 can perform a utility-based analysis that factors cost of initiating the above-described operations versus benefit. In this embodiment, an artificial intelligence component can use one or more additional context conditions to determine an appropriate threshold or context information, or to determine an update for a machine-learning based model.

To facilitate the above-described functions, an ML component herein can perform classifications, correlations, inferences, and/or expressions associated with principles of artificial intelligence. For instance, an ML component 124 can employ an automatic classification system and/or an automatic classification. In one example, the ML component 124 can employ a probabilistic and/or statistical-based analysis (e.g., factoring into the analysis utilities and costs) to learn and/or generate inferences. The ML component 124 can employ any suitable machine-learning based techniques, statistical-based techniques and/or probabilistic-based techniques. For example, the ML component 124 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 124 can perform a set of machine-learning computations. For instance, the ML component 124 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

According to an embodiment, the neural network 132 can, based on the respective output embeddings, generate respective bounding box labels for each respective bounding box. It is noted that each bounding box label can comprise a respective type of field/entity in the document. In this regard, the neural network 132 can determine a plurality of bounding box label probabilities for each text bounding box. It is noted that the plurality of bounding box label probabilities for each text bounding box can be representative of a probability of each possible bounding box label for each text bounding box. It is noted that the neural network 132 can be utilized in training and/or inferencing herein.

It is noted that the respective bounding box labels can be generated using a combinatorial optimization algorithm applied to the one or more bounding box label probabilities for each respective text bounding box. According to an embodiment, the post processing component 128 can perform Hungarian matching (or another suitable a combinatorial optimization algorithm) in order to remove duplicates and/or improve accuracy of the respective bounding box labels herein. In various embodiments, the post processing component 128 can further associate each respective bounding box label with each respective text. Further in this regard, the post processing component 128 can, based on the one or more bounding box label probabilities for each respective text bounding box, generate the respective bounding box labels. It is noted that the post processing component 128 can be utilized in inferencing herein.

According to an embodiment, the angle component 114 can determine angle information representative of angular relationships between the plurality of text bounding boxes. In this regard, the determining respective output embeddings for each respective text bounding box can be further based on the transformer-based deep learning model (e.g., model 134) applied to the angle information. For example, if a first name is at an upper corner and then a date is right below it, it could be a birthdate. However, in this example, if a date is 45 degrees with respect to a first name, then the date could be an expiration date. In various embodiments herein, angle information between text bounding boxes can be utilized in order to determine text bounding box type. Thus, final predictions herein can be based on a whole set of text bounding boxes and not on each individually. In this regard, angle information can contribute to relative importance of text bounding boxes herein. In various embodiments, for relationships between text bounding boxes, angular information can be just as important as positional information. Thus, two bounding boxes that are vertical neighbors can be related differently than if they were horizontal neighbors. According to an embodiment, the distance component 116 can determine relative distances (e.g., polar relative distances, Euclidean distances, etc.) between the plurality of text bounding boxes. In this regard, the determining respective output embeddings for each respective text bounding box can be further based on the transformer-based deep learning model applied to the polar relative distances. In various embodiments, the OCR component 118 can be utilized to identify the respective text in the document using electronic character recognition. It is noted that in various implementations, the document can comprise a proof of identity (POI) document. In this regard, the OCR component 118 can determine bounding boxes and respective text of a proof of identity document using electronic optical character recognition applied to the proof of identity document.

According to an embodiment, the modification component 130 can determine the bias information representative of a modification to an attention weight of a transformer-based machine learning model as later discussed in greater detail herein.

Figure 2:
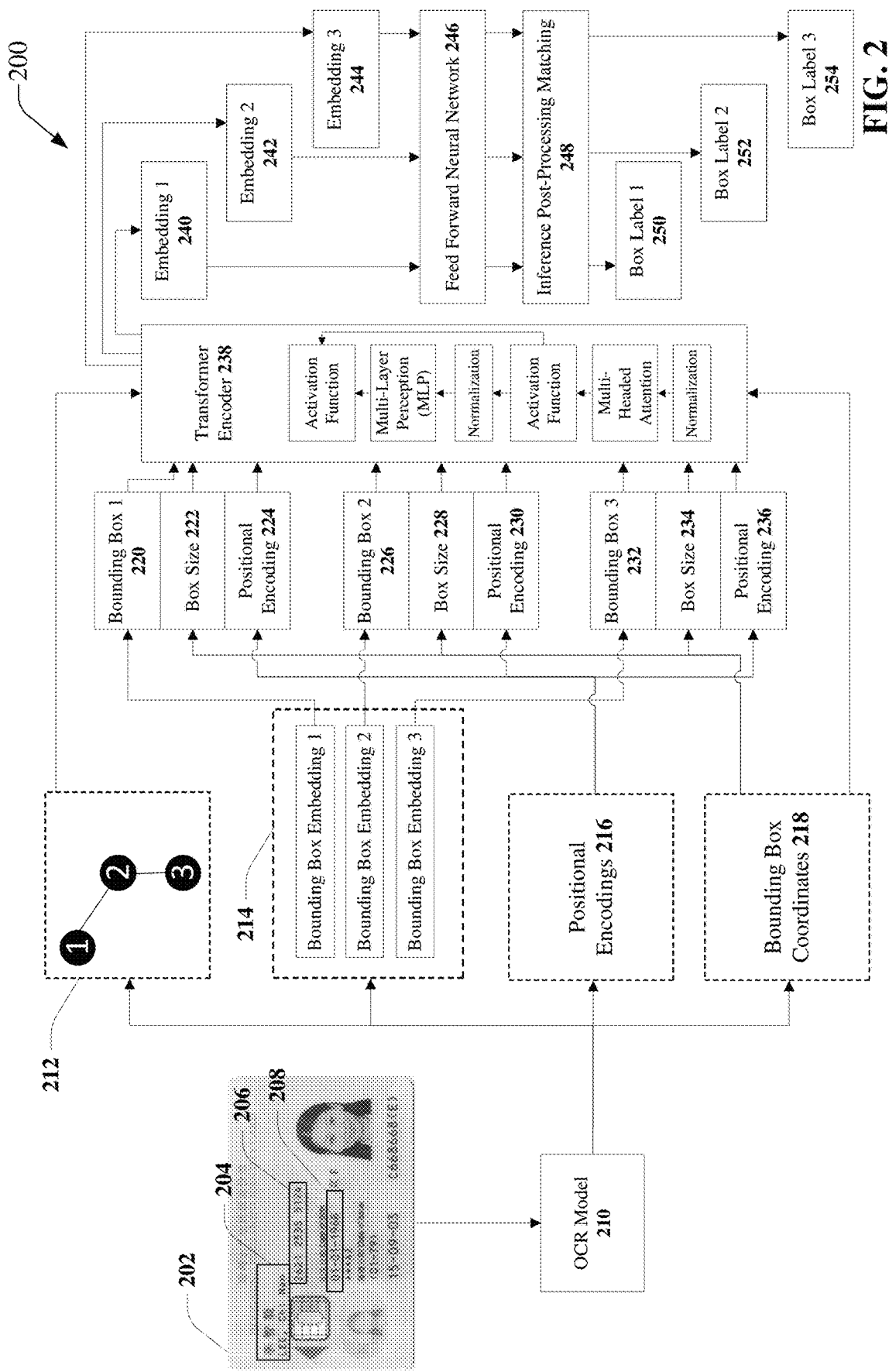
FIG. 2 is a block diagram of an exemplary system architecture in accordance with one or more embodiments described herein.

With reference to FIG. 2, there is illustrated an exemplary system architecture 200 and associated flow in accordance with one or more embodiments described herein. According to an embodiment, document 202 can comprise a scan or image of a POI document. In an example, document 202 can comprise an identity card or a driver's license, though other suitable POI documents can be utilized. It is noted that document 202 can comprise text bounding box 204, text bounding box 206, and text bounding box 208, though the foregoing is exemplary, and documents herein can comprise a variety of suitable quantities and/or types of text bounding boxes. According to an embodiment, the document 202 can be subjected to an OCR model 210 (e.g., using OCR component 118) in order to generate the text bounding box 204, text bounding box 206, text bounding box 208, or other suitable text bounding boxes. According to an example, the text bounding box 204 can comprise a name, the text bounding box 206 can comprise a card or ID number, and the text bounding box 208 can comprise a date of birth. In various embodiments, output from the OCR model 210 can be utilized in the determination of neighborhood information 212, bounding box embeddings 214, positional encodings 216, bounding box coordinates 218, or other suitable determinations.

The neighborhood information 212 can be representative of a degree to which each text bounding box of the plurality of text bounding boxes is a neighbor to another text bounding box of the plurality of text bounding boxes. According to an embodiment, the neighborhood information 212 can comprise a conditional attention bias based on graph structure. In this regard, conditional attention bias herein can be based on a graph structure representative of relative positions of the plurality of text bounding boxes. Further in this regard, the relative positions of the plurality of text bounding boxes can comprise neighbor information representative of a degree to which each text bounding box of the plurality of text bounding boxes is a neighbor to another text bounding box of the plurality of text bounding boxes.

The bounding box embeddings 214 can comprise an embedding layer comprising vector representations of the text output from the OCR model 210. According to an embodiment, the bounding box embedding 1 of the bounding box embeddings 214 can be associated with text bounding box 204, and can be output to bounding box 1 220, the bounding box embedding 2 of the bounding box embeddings 214 can be associated with text bounding box 206, and can be output to bounding box 2 226, and the bounding box embedding 3 of the bounding box embeddings 214 can be associated with text bounding box 208, and can be output to bounding box 3 232. The positional encodings 216 can be based on information representative of positions of the bounding boxes. According to an embodiment, the positional encodings associated with text bounding box 204 can be utilized to determine positional encoding 224 for text bounding box 204, the positional encodings associated with text bounding box 206 can be utilized to determine positional encoding 230 for text bounding box 206, and the positional encodings associated with text bounding box 208 can be utilized to determine positional encoding 236 for text bounding box 208. In various embodiments, the bounding box coordinates 218 can be utilized to determine absolute or relative positions, and/or polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems) of the text bounding boxes. In one or more embodiments, the bounding box coordinates 218 can comprise a conditional attention bias based on polar coordinates (or cartesian coordinates, spherical coordinates, cylindrical coordinates, homogeneous coordinates, curvilinear coordinates, generalized coordinates, canonical coordinates, barycentric coordinates, trilinear coordinates, or other suitable coordinates or systems). According to an embodiment, the bounding box coordinates associated with text bounding box 204 can be utilized to determine box size 222 for text bounding box 204, the bounding box coordinates associated with text bounding box 206 can be utilized to determine box size 228 for text bounding box 206, and the bounding box coordinates associated with text bounding box 208 can be utilized to determine box size 234 for text bounding box 208.

Outputs from the neighborhood information 212 (e.g., graph structure), bounding box embeddings 214, positional encodings 216, and/or bounding box coordinates 218 can be utilized to generate inputs for the transformer encoder 238. For example, the transformer encoder 238 can aggregate the neighborhood information 212, bounding box 1 (embedding) 220, box size 222, positional encoding 224, bounding box 2 (embedding) 226, box size 228, positional encoding 230, bounding box 3 (embedding) 232, box size 234, positional encoding 236, and/or bounding box coordinates 218 in order to generate embedding 1 (output) 240 associated with text bounding box 204, embedding 2 (output) 242 associated with text bounding box 206, and embedding 3 (output) 244 associated with text bounding box 208. It is noted that the transformer encoder 238 can comprise a multi-headed attention layer. The multi-headed attention layer of the transformer encoder 238 can utilize biases to weights so that new weights can be focused on relative distance and/or certain neighbors in a graph (e.g., neighborhood information 212).

According to an embodiment, polar relative distance formulas utilized by the transformer encoder 238 or other suitable components can comprise:

$$Z_i = \sum_{i=1}^{n} \alpha_{ij} X_i (W^v) \quad \text{Equation (1)}$$

$$e_{ij} = \frac{(X_i W^Q)(X_j W^K)}{\sqrt{d_z}} + b_{\phi(v_i, v_j)} + b_{neighbor} \quad \text{Equation (2)}$$

$$\alpha_{ij} = \frac{\exp(e_{ij})}{\sum_{k=1}^{n} e_{ij}} \quad \text{Equation (3)}$$

In this regard, $e_{ij}$ can represent weight. Further in this regard, each $e_{ij}$ can comprise relative weight of one bounding box. Bias terms based on $v_i$ and $v_j$ can be based on polar relative distances. In this regard, angle information between two text bounding boxes and relative distances can be utilized in multi-headed attention layer processing. It is noted that in Equation (2), $b_{\phi(v_i, v_j)}$ can represent a bias term based on polar relative distance that can be added to attention weight (e.g., attention weight bias based on graph structure). $b_{\phi(v_i, v_j)}$ can comprise a learnable scalar conditioned upon $\phi(v_i, v_j)$ in which $\phi$ can represent one or two multilayer perceptions functions that can take $v_i$, $v_j$ as input and generate the polar relative distance between $v_i$ and $v_j$ as an output. $b_{neighbor}$ can represent a bias term based on graph structure that can be added to attention weight. $b_{neighbor}$ can comprise a learnable scalar conditioned upon neighbor information representative of a degree to which one text bounding box of the plurality of text bounding boxes is a neighbor to another text bounding box of the plurality of text bounding boxes. In an example, the attention weight can be set to zero if a condition is determined to be satisfied (e.g., i and j are determined to comprise third degree neighbors). By utilizing attention weight bias based on graph structure, for example, neighbors of smaller grades can be assigned a higher bias, thus emphasizing respective mutual importance. By utilizing masked attention, for example, a graph can be constructed based on the positions of the bounding boxes, and then masked attention can be applied based on their graph structures in which attention weights can be preserved for near neighbors (e.g., neighbors comprising a threshold distance), and can be set to 0 for far neighbors (e.g., neighbors comprising a threshold distance).

By utilizing neighborhood structure (e.g., graph structure) rather than only absolute distances, the transformer encoder 238 herein can be more capable of capturing relationships between text bounding boxes, especially when input POI documents comprise varying sizes. In an implementation, the transformer encoder 238 can output embedding vectors for each bounding box, which can then be utilized in a feed forward neural network (e.g., feed forward neural network 246) (e.g., for label prediction). Thus, the output embeddings 240, 242, and/or 244 can be processed using a feed forward neural network 246. The output embeddings can comprise an embedding vector for each bounding box which can be utilized to predict type/entity probabilities. In various embodiments, the feed forward neural network 246 can learn weights and/or determine weights to place on various relative distances herein. For example, if two bounding boxes are 45 degrees from one another, and 3 cm apart from one another, the transformer encoder 238 and/or feed forward neural network 246 can learn to determine that that one is threshold likely a date of birth and the other is threshold likely a name. In various embodiments, transformer encoders, machine learning components, and/or neural networks herein can leverage prior information (e.g., from templates or previously analyzed documents) which can comprise one or more of a variety of formats or layouts. In this regard, the transformer encoder 238 and/or feed forward neural network 246 can learn how said documents or templates are formatted. Additionally, the transformer encoder 238 and/or feed forward neural network 246 can learn weights to place on bounding boxes based on, for instance, degrees of neighborhood separation. For example, bounding boxes that are first degree neighbors to each other can be weighted more heavily than bounding boxes that are second degree neighbors.

Next, inference post processing matching 248 can be performed. The foregoing can result in box label 1 250 associated with text bounding box 204, box label 2 252 associated with text bounding box 206, and box label 3 254 associated with text bounding box 208. In this regard, the inference post processing matching 248 can remove duplicates and/or improve accuracy. For example, a combinatorial optimization algorithm (e.g., Hungarian matching) can be utilized in the inference post processing matching 248. In various embodiments herein, angle information between text bounding boxes can be utilized in order to determine text bounding box type. Thus, final predictions herein can be based on a whole set, not on each individually. In this regard, angle information can contribute to relative importance of text bounding boxes herein. For example, for relationships between text bounding boxes, angular information can be just as important as positional information. Thus, two bounding boxes that are vertical neighbors can be related differently than if they were horizontal neighbors.

FIG. 3 illustrates a block diagram of an exemplary combinatorial optimization algorithm in accordance with one or more embodiments described herein. For example, FIG. 3 can utilize Hungarian matching or another suitable combinatorial optimization algorithm. In FIG. 3, benefits of utilizing a combinatorial optimization algorithm in post processing herein can be appreciated. According to an embodiment, a transformer encoder, neural network, and/or post processing component herein can generate the illustrated probabilities for Boxes 1 and 2. In this regard, Box 1 can be determined to comprise an 80% probability of comprising a date of birth and a 10% probability of comprising an expiry date. Similarly, Box 2 can be determined to comprise a 55% probability of comprising a date of birth and a 40% chance of comprising an expiry date. Thus, based on utilizing pure probabilities, both of Boxes 1 and 2 would be designated as date of birth. However, because a POI document typically comprises one of each field, a combinatorial optimization algorithm, such as Hungarian matching herein, can be utilized to solve such an assignment problem in order to determine the most likely entity for each bounding box. Thus, by utilizing a combinatorial optimization algorithm, Box 1 can be determined to comprise date of birth and Box 2 can be determined to comprise expiry date.

Figure 4:
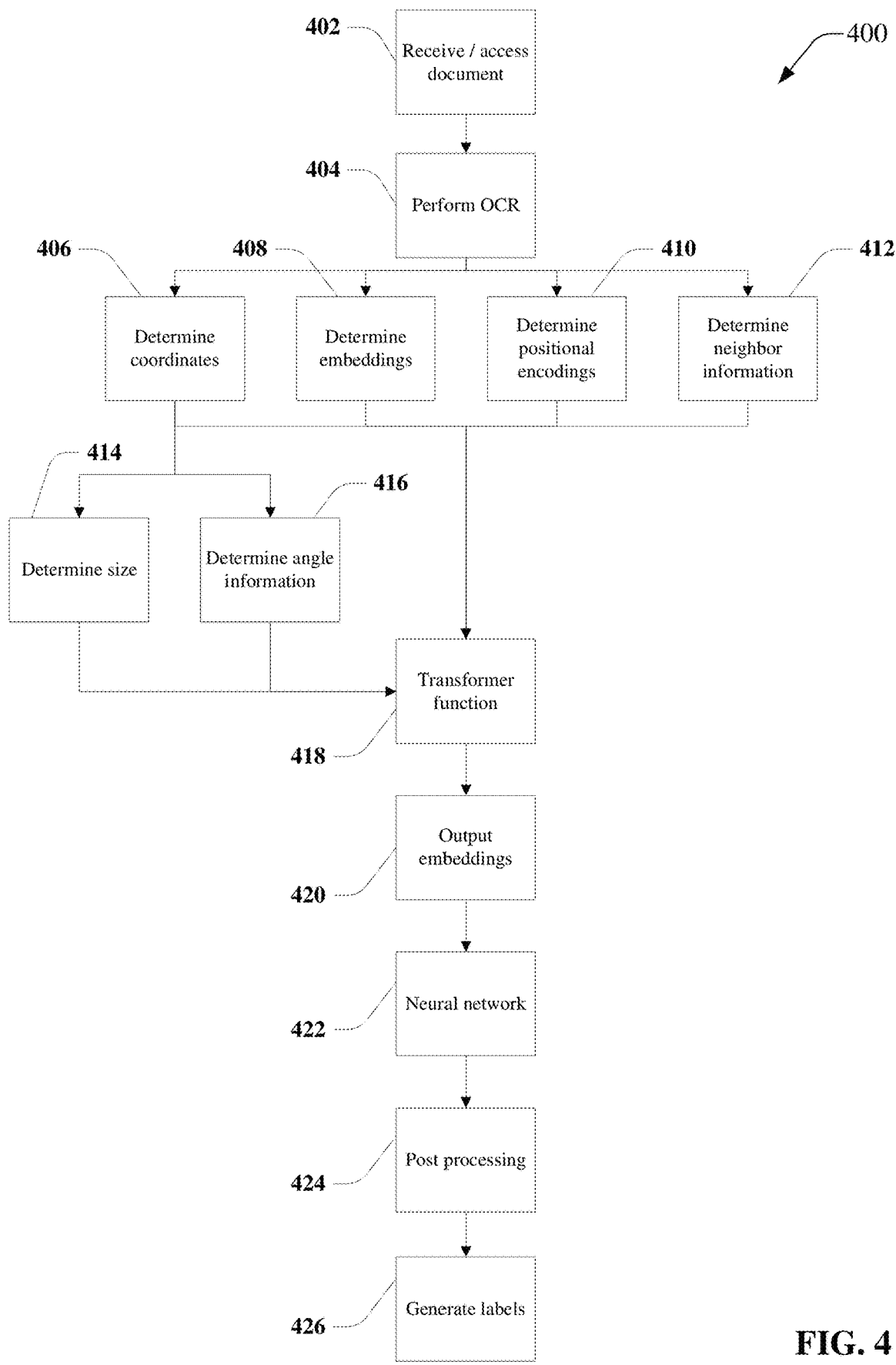
FIG. 4 is a flowchart of exemplary entity extraction in accordance with one or more embodiments described herein.

Turning now to FIG. 4, there is illustrated a flowchart of a process 400 for exemplary entity extraction in accordance with one or more embodiments herein. At 402, a document (e.g., a POI document) can be accessed or received (e.g., using a communication component 110). At 404, optical character recognition can be performed on the document received at 402 (e.g., using an OCR component 118). In this regard, bounding boxes and respective text of a proof of identity document can be determined (e.g., via the OCR component 118) using electronic optical character recognition applied to the proof of identity document. At 406, for each respective bounding box, respective text bounding box coordinates (e.g., x,y absolute coordinates of corners) can be determined (e.g., using a position component 112). At 408, for each respective bounding box, respective text bounding box input embeddings (e.g., comprising input vectors for each text bounding box and the respective text) can be determined (e.g., using an input vector component 120). At 410, based on the respective text bounding box coordinates, respective text bounding box positional encodings can be determined for each respective text bounding box (e.g., using a positional encoding component 122). In various embodiments, respective positional encoding vectors can be added to respective token embeddings. At 412, neighbor information representative of a degree to which each text bounding box of the plurality of text bounding boxes is a neighbor to another text bounding box of the plurality of text bounding boxes can be determined (e.g., using the position component 112).

At 414, respective sizes of the text bounding boxes can be determined based on the bounding box coordinates determined at 406. At 416, angle information representative of angular relationships between the plurality of text bounding boxes can be determined (e.g., using the angle component 114). At 418, a transformer function based on a transformer-based deep learning model can be applied (e.g., via a transformer component 126 or transformer encoder 238) to respective text bounding box input embeddings, respective text bounding box coordinates, respective text bounding box positional encodings, respective text bounding box neighbor information, respective text bounding box size, respective text bounding box angle information, and/or bias information representative of a modification to an attention weight of the transformer-based deep learning model in order to determining respective output embeddings for each respective text bounding box at 420. At 422, the respective output embedding passes through a feed forward neural network (e.g., neural network 132 or feed forward neural network 246) in order to generate class labels (e.g., field/entity types) and/or respective probabilities for the text bounding boxes. At 424, post processing (e.g., using a combinatorial optimization algorithm) can be utilized in order to determine a respective bounding box label for each bounding box (e.g., via the post processing component 128). At 426, respective bounding box labels can be generated for the bounding box and/or associated with the respective text.

Figure 5:
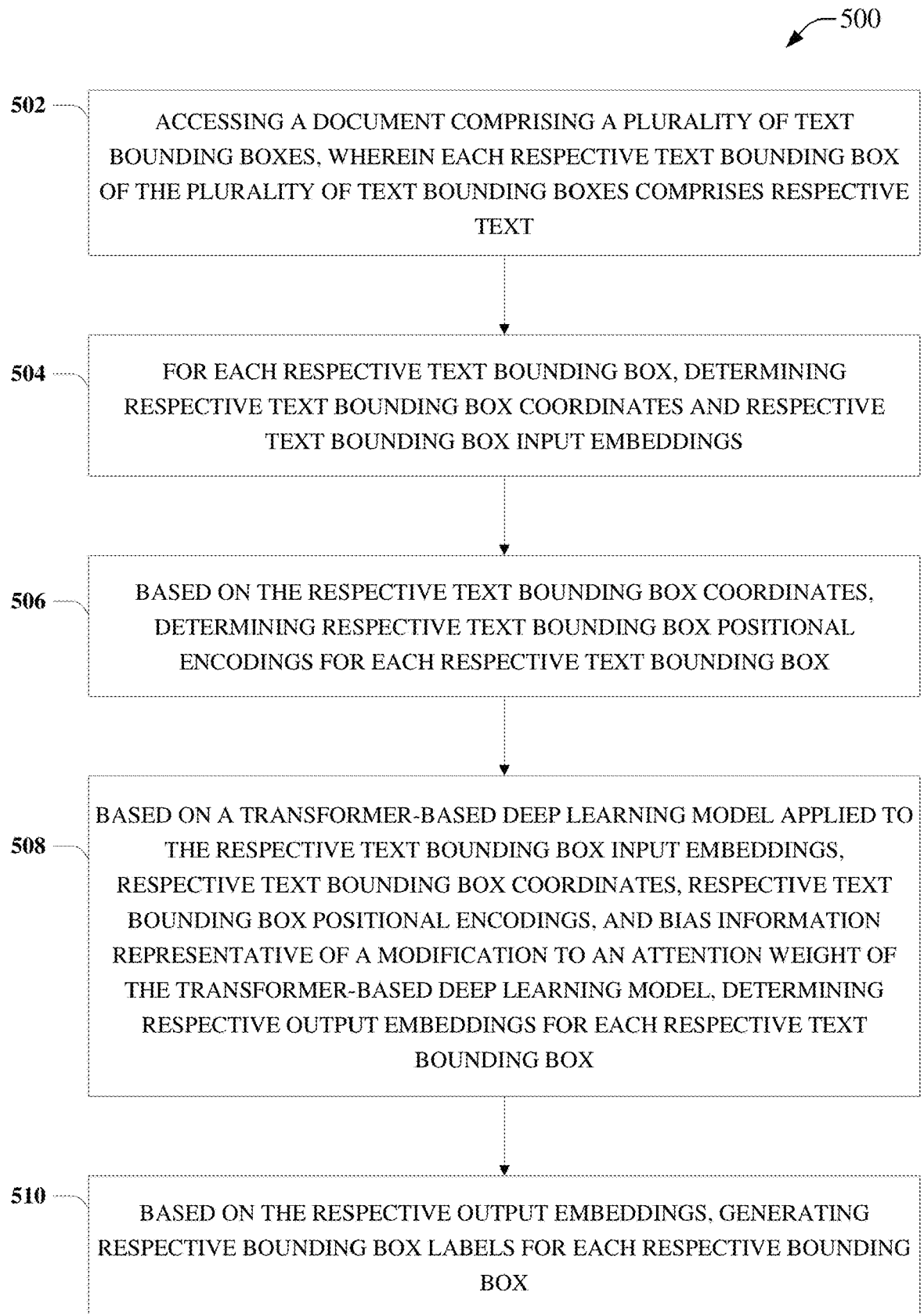
FIG. 5 is a block flow diagram for a process associated with entity extraction in accordance with one or more embodiments described herein.

FIG. 5 illustrates a block flow diagram for a process 500 associated with entity extraction in accordance with one or more embodiments described herein. At 502, the process 500 can comprise accessing (e.g., using a communication component 110) a document comprising a plurality of text bounding boxes, wherein each respective text bounding box of the plurality of text bounding boxes comprises respective text. At 504, the process 500 can comprise, for each respective text bounding box, determining (e.g., using a position component 112 and/or input vector component 120) respective text bounding box coordinates and respective text bounding box input embeddings. At 506, the process 500 can comprise, based on the respective text bounding box coordinates, determining (e.g., using the positional encoding component 122) respective text bounding box positional encodings for each respective text bounding box. At 508, the process 500 can comprise, based on a transformer-based deep learning model applied to the respective text bounding box input embeddings, respective text bounding box coordinates, respective text bounding box positional encodings, and bias information representative of a modification to an attention weight of the transformer-based deep learning model, determining (e.g., using the transformer component 126) respective output embeddings for each respective text bounding box. At 510, the process 500 can comprise, based on the respective output embeddings, generating (e.g., using the post processing component 128) respective bounding box labels for each respective bounding box.

FIG. 6 illustrates a block flow diagram for a process 600 associated with entity extraction in accordance with one or more embodiments described herein. At 602, the process 600 can comprise, generating, by a computer system comprising a processor (e.g., using an input vector component 120), input embeddings representative of text bounding box coordinates of a document comprising a plurality of text bounding boxes and respective text identified using electronic optical character recognition. At 604, the process 600 can comprise, based on the input embeddings, determining, by the computer system (e.g., using the positional encoding component 122), text bounding box positional encodings for each respective text bounding box. At 606, the process 600 can comprise determining, by the computer system (e.g., using the modification component 130), bias information representative of a modification to an attention weight of a transformer-based machine learning model. At 608, the process 600 can comprise determining, by the computer system (e.g., using the transformer component 126), output embeddings for each text bounding box using the transformer-based machine learning model applied to the input embeddings, text bounding box coordinates, text bounding box positional encodings, and the bias information. At 610, the process 600 can comprise generating, by the computer system and using machine learning applied to the output embeddings (e.g., using the post processing component 128, ML component 124, and/or neural network 132), a plurality of bounding box label probabilities for each text bounding box. At 612, the process 600 can comprise generating, by the computer system and based on the plurality of bounding box label probabilities for each text bounding box (e.g., using the post processing component 128, ML component 124, and/or neural network 132), a respective bounding box label for each text bounding box, wherein each bounding box label comprises a respective type of field in the document.

Figure 7:
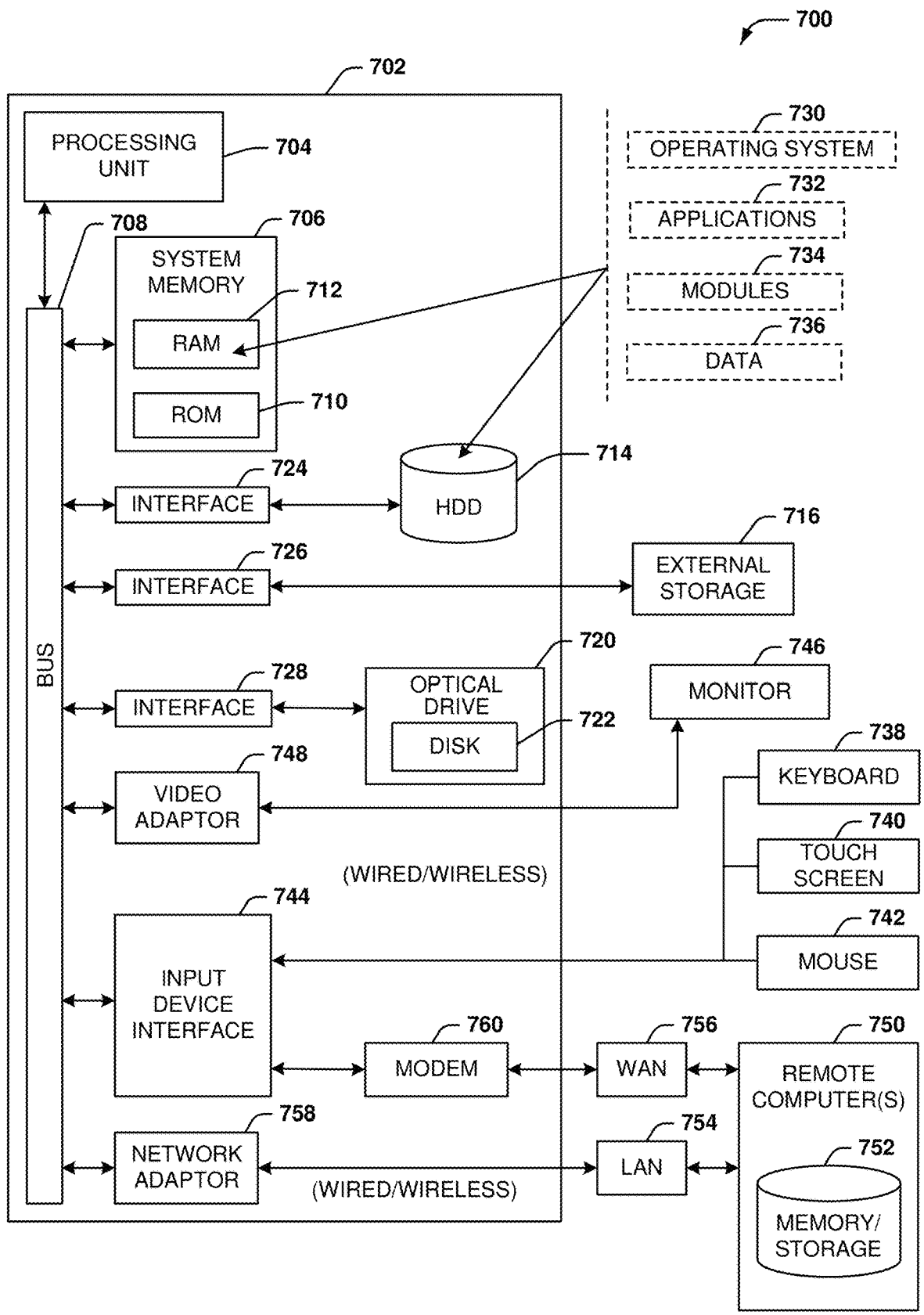
FIG. 7 is an example, non-limiting computing environment in which one or more embodiments described herein can be implemented.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can be enable with a security module, such as a trusted processing module (TPM). For instance, with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the Internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
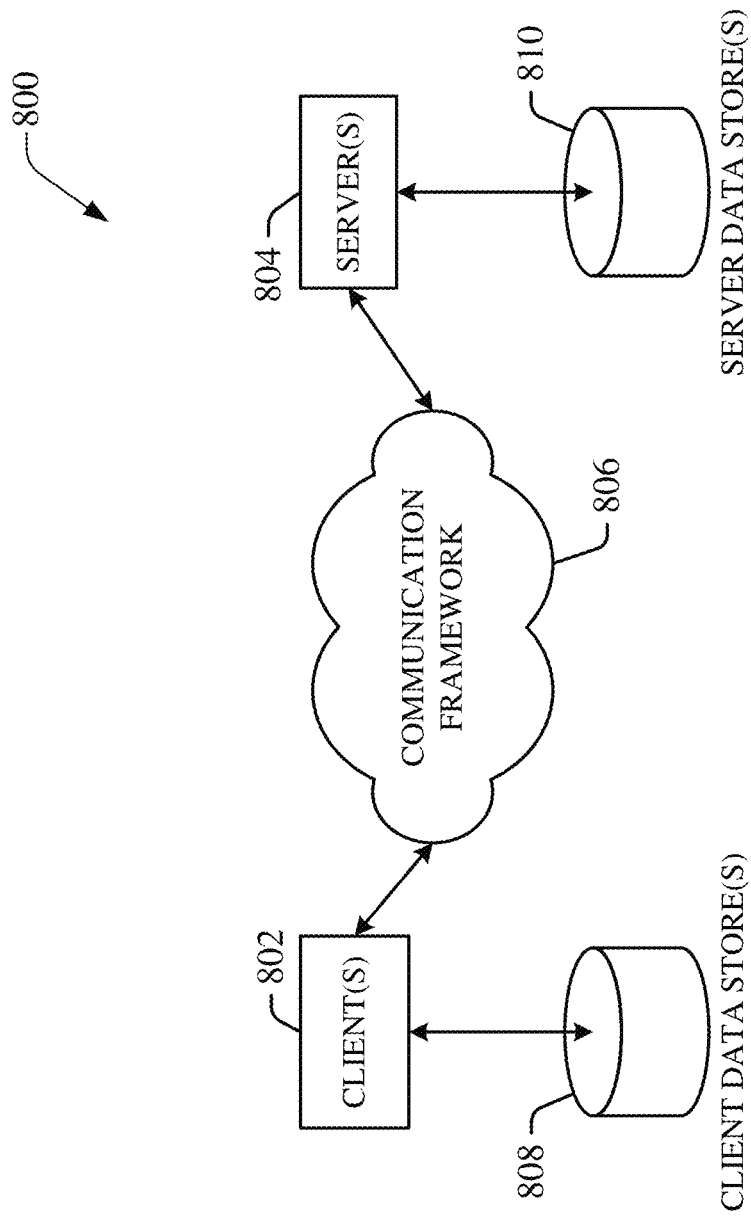
FIG. 8 is an example, non-limiting networking environment in which one or more embodiments described herein can be implemented.

Referring now to FIG. 8, there is illustrated a schematic block diagram of a computing environment 800 in accordance with this specification. The system 800 includes one or more client(s) 802, (e.g., computers, smart phones, tablets, cameras, PDA's). The client(s) 802 can be hardware and/or software (e.g., threads, processes, computing devices). The client(s) 802 can house cookie(s) and/or associated contextual information by employing the specification, for example.

The system 800 also includes one or more server(s) 804. The server(s) 804 can also be hardware or hardware in combination with software (e.g., threads, processes, computing devices). The servers 804 can house threads to perform transformations of media items by employing aspects of this disclosure, for example. One possible communication between a client 802 and a server 804 can be in the form of a data packet adapted to be transmitted between two or more computer processes wherein data packets may include coded analyzed headspaces and/or input. The data packet can include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated via a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

In one exemplary implementation, a client 802 can transfer an encoded file, (e.g., encoded media item), to server 804. Server 804 can store the file, decode the file, or transmit the file to another client 802. It is noted that a client 802 can also transfer uncompressed file to a server 804 and server 804 can compress the file and/or transform the file in accordance with this disclosure. Likewise, server 804 can encode information and transmit the information via communication framework 806 to one or more clients 802.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a non-transitory computer-readable medium having stored thereon computer-executable instructions that are executable by the system to cause the system to perform operations comprising:
   accessing a document comprising a plurality of text bounding boxes, wherein each respective text bounding box of the plurality of text bounding boxes comprises respective text;
   for each respective text bounding box, determining respective text bounding box coordinates and respective text bounding box input embeddings;
   based on the respective text bounding box coordinates, determining respective text bounding box positional encodings for each respective text bounding box;
   based on a transformer-based deep learning model applied to the respective text bounding box input embeddings, respective text bounding box coordinates, respective text bounding box positional encodings, and bias information representative of a modification to an attention weight of the transformer-based deep learning model, determining respective output embeddings for each respective text bounding box; and
   based on the respective output embeddings, generating respective bounding box labels for each respective bounding box.

2. The system of claim 1, wherein determining respective bounding box labels for each respective bounding box comprises determining, using a neural network, one or more bounding box label probabilities for each respective text bounding box, and wherein the operations further comprise:
   based on the one or more bounding box label probabilities for each respective text bounding box, generating the respective bounding box labels.

3. The system of claim 2, wherein the respective bounding box labels are generated using Hungarian matching applied to the one or more bounding box label probabilities for each respective text bounding box.

4. The system of claim 2, wherein the neural network is trained based on one or more template documents associated with the document.

5. The system of claim 1, wherein the bias information comprises a conditional attention bias based on a graph structure representative of relative positions of the plurality of text bounding boxes.

6. The system of claim 1, wherein the bias information comprises a conditional attention bias based on polar coordinates of the plurality of text bounding boxes.

7. The system of claim 1, wherein the operations further comprise:
  determining angle information representative of angular relationships between the plurality of text bounding boxes, wherein the determining respective output embeddings for each respective text bounding box is further based on the transformer-based deep learning model applied to the angle information.

8. The system of claim 1, wherein the operations further comprise:
  determining polar relative distances between the plurality of text bounding boxes, wherein the determining respective output embeddings for each respective text bounding box is further based on the transformer-based deep learning model applied to the polar relative distances.

9. The system of claim 1, wherein the transformer-based deep learning model is generated based on using machine learning applied to past documents comprising a past plurality of text bounding boxes, other than the document.

10. The system of claim 1, wherein the respective text is identified using electronic optical character recognition.

11. The system of claim 1, wherein the document comprises a proof of identity document.

12. A computer-implemented method, comprising:
  generating, by a computer system comprising a processor, input embeddings representative of text bounding box coordinates of a document comprising a plurality of text bounding boxes and respective text identified using electronic optical character recognition;
  based on the input embeddings, determining, by the computer system, text bounding box positional encodings for each respective text bounding box;
  determining, by the computer system, bias information representative of a modification to an attention weight of a transformer-based machine learning model;
  determining, by the computer system, output embeddings for each text bounding box using the transformer-based machine learning model applied to the input embeddings, text bounding box coordinates, text bounding box positional encodings, and the bias information;
  generating, by the computer system and using machine learning applied to the output embeddings, a plurality of bounding box label probabilities for each text bounding box; and
  generating, by the computer system and based on the plurality of bounding box label probabilities for each text bounding box, a respective bounding box label for each text bounding box, wherein each bounding box label comprises a respective type of field in the document.

13. The computer-implemented method of claim 12, wherein the plurality of bounding box label probabilities for each text bounding box are representative of a probability of each possible bounding box label for each text bounding box.

14. The computer-implemented method of claim 12, wherein the respective bounding box label for each text bounding box are generated, by the computer system, using Hungarian matching applied to the plurality of bounding box label probabilities for each text bounding box of the plurality of text bounding boxes.

15. The computer-implemented method of claim 12, wherein the bias information comprises a conditional attention bias based on a graph structure representative of relative positions of the plurality of text bounding boxes.

16. The computer-implemented method of claim 15, wherein the relative positions of the plurality of text bounding boxes comprise neighbor information representative of a degree to which each text bounding box of the plurality of text bounding boxes is a neighbor to another text bounding box of the plurality of text bounding boxes.

17. The computer-implemented method of claim 12, wherein the bias information comprises a conditional attention bias based on polar coordinates of the plurality of text bounding boxes.

18. The computer-implemented method of claim 12, wherein the transformer-based machine learning model is generated, by the computer system, based on machine learning applied to past documents comprising a past plurality of text bounding boxes, other than the document, and to one or more template documents associated with the document.

19. A system comprising:
  a processor that executes computer executable components stored in memory;
  an optical character recognition component that determines bounding boxes and respective text of a proof of identity document using electronic optical character recognition applied to the proof of identity document;
  an input vector component that generates input embeddings for each bounding box and respective text of the proof of identity document;
  a position component that determines absolute coordinates of the bounding boxes;
  a positional encoding component that determines positional encodings for each bounding box;
  a graph component that determines a degree to which degree bounding box pairs of the bounding boxes are neighbors;
  a distance component that determines polar relative distances for the bounding box pairs;
  a transformer component that determines output embeddings for each bounding box based on a transformer-based deep learning model applied to the input embeddings, bounding box coordinates, positional encodings, and bias information representative of a modification to an attention weight of the transformer-based deep learning model;
  a neural network component that generates a plurality of bounding box label probabilities for each bounding box; and
  a post-processing component that,
    based on the plurality of bounding box label probabilities and using Hungarian matching, determines a respective bounding box label for each bounding box, and
    associates each respective bounding box label with each respective text.

20. The system of claim 19, wherein the bias information comprises a conditional attention bias based on a graph structure representative of relative positions of the bounding boxes and a conditional attention bias based on polar coordinates of the bounding boxes.

* * * * *